United States Patent [19]

Craig

[11] Patent Number: 5,581,998
[45] Date of Patent: Dec. 10, 1996

[54] BIOMASS FUEL TURBINE COMBUSTER

[76] Inventor: Joe D. Craig, P.O. Box 70, Tahoka, Tex. 79373

[21] Appl. No.: 554,246

[22] Filed: Nov. 8, 1995

Related U.S. Application Data

[63] Continuation of Ser. No. 264,010, Jun. 22, 1994, abandoned.
[51] Int. Cl.$^6$ .................................................. F02C 1/00
[52] U.S. Cl. ............................................ 60/39.29; 60/733
[58] Field of Search ......................... 60/732, 733, 39.12, 60/39.464, 39.23, 39.29; 110/245, 346

[56] References Cited

U.S. PATENT DOCUMENTS

| | | |
|---|---|---|
| 2,856,273 | 10/1958 | Beber et al. . |
| 2,941,862 | 6/1960 | Cyr et al. . |
| 2,959,537 | 11/1960 | Welty, Jr. . |
| 3,002,805 | 10/1961 | Browning, Jr. et al. . |
| 3,098,458 | 7/1963 | Lantz, Jr. . |
| 3,362,887 | 1/1968 | Rodgers . |
| 3,571,946 | 3/1971 | Karweil et al. . |
| 3,767,756 | 10/1973 | Blades . |
| 3,863,577 | 2/1975 | Steever et al. . |
| 4,022,820 | 5/1977 | Johnson . |
| 4,041,906 | 8/1977 | Edwards . |
| 4,095,958 | 6/1978 | Caughey . |
| 4,203,689 | 5/1980 | Kraxner et al. . |
| 4,285,193 | 8/1981 | Shaw et al. . |
| 4,308,034 | 12/1981 | Hoang . |
| 4,308,374 | 12/1981 | Vollbracht et al. . |
| 4,334,484 | 6/1982 | Payne et al. . |
| 4,378,240 | 3/1983 | Siegle et al. . |
| 4,427,053 | 1/1984 | Klaren . |
| 4,470,358 | 9/1984 | Prochnow . |
| 4,530,700 | 7/1985 | Sawyer et al. . |
| 4,592,762 | 6/1986 | Babu et al. . |
| 4,599,953 | 7/1986 | Gould . |
| 4,638,629 | 1/1987 | Archer et al. ........................ 60/39.12 |
| 4,699,632 | 10/1987 | Babu et al. . |
| 4,702,073 | 10/1987 | Melconian ............................. 60/39.464 |
| 4,732,092 | 3/1988 | Gould . |
| 4,787,208 | 11/1988 | DeCorso . |
| 4,819,438 | 2/1989 | Schultz ...................................... 60/732 |
| 4,838,030 | 6/1989 | Cramer . |
| 4,848,249 | 7/1989 | LePori et al. . |
| 4,912,931 | 4/1990 | Joshi et al. ................................. 60/732 |

(List continued on next page.)

OTHER PUBLICATIONS

R. M. Pierce et al. Advanced Combustion Systems for Stationary Gas Turbine Engines, Jan. 1980, pp. 1–31, 84–87.
Paskin et al. Composite Matrix Cooling Scheme For Small Gas Turbvine Combustors, Jul. 1990, all pages (1–10).
Sixto, J. Nitrogen Oxides Reduction by Staged Combustion of LCV Gas, Aug. 1990, pp. 11–21, 55–67, 81.
"Powerlines—News for Tampella Power's Customers", Summer 1993, pp. 2–15.
"The New Generation of Biomass Power Plant", Advertisement of BIOFLOW Ltd, date unknown, pp. 1–3.
"Westinghouse: Focusing Our Energy On The Future", Advertisement of Westinghouse, date unknown, pp. 1–3.
"Integrated turbine system has worldwide potential", Bio Tech Brief, Feb. 1994, pp. 1–2.

*Primary Examiner*—Timothy S. Thorpe
*Attorney, Agent, or Firm*—Novak Druce Reynolds Burt

[57] ABSTRACT

A gas turbine combustor apparatus utilized in conjunction with a biomass fueled pressurized gasifier, the fuel gas and primary air injected into a primary combustion chamber at independently controlled rates in order to provide a rich burn of the fuel gas at a constant temperature which inhibits formation of nitrogen oxides, the combustion product of the primary combustion chamber flowing downstream through a chamber combustion nozzle and then to a secondary combustion chamber, a secondary air injected into the secondary combustion chamber at an independently controlled rate in order to provide a lean burn of the combustion product of the primary combustion chamber, also inhibiting the formation of nitrogen oxides. The combustion product of this lean burn being diluted by injection of a tertiary air independently controlled, the diluted combustion product expelled to a land based stationary turbine. The combustor designed to efficiently burn low BTU biomass fuel gas.

23 Claims, 6 Drawing Sheets

U.S. PATENT DOCUMENTS

| | | |
|---|---|---|
| 4,928,481 | 5/1990 | Joshi et al. . |
| 4,968,325 | 11/1990 | Black et al. . |
| 5,025,622 | 6/1991 | Melconian ............................ 60/732 |
| 5,072,675 | 12/1991 | Fowler . |
| 5,184,455 | 2/1993 | Ewing et al. . |
| 5,207,053 | 5/1993 | Spadaccini et al. . |
| 5,255,506 | 10/1993 | Wilkes et al. ........................ 60/39.12 |
| 5,279,234 | 1/1994 | Bender et al. . |
| 5,290,327 | 3/1994 | Rossle . |

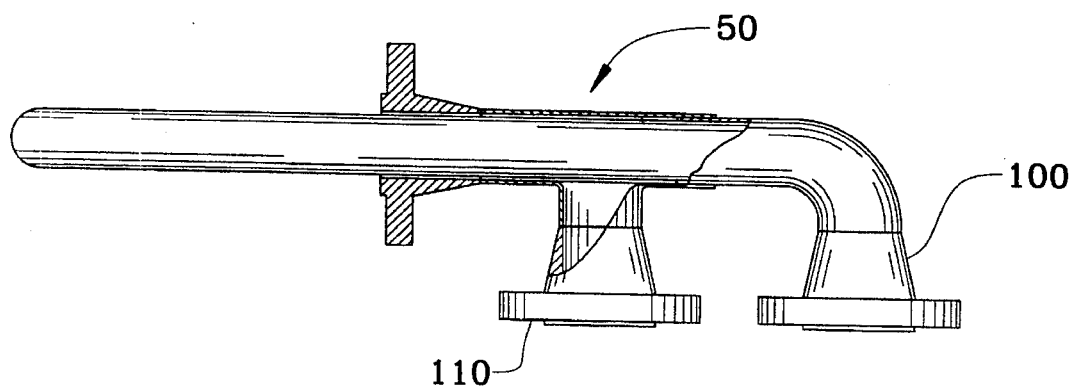
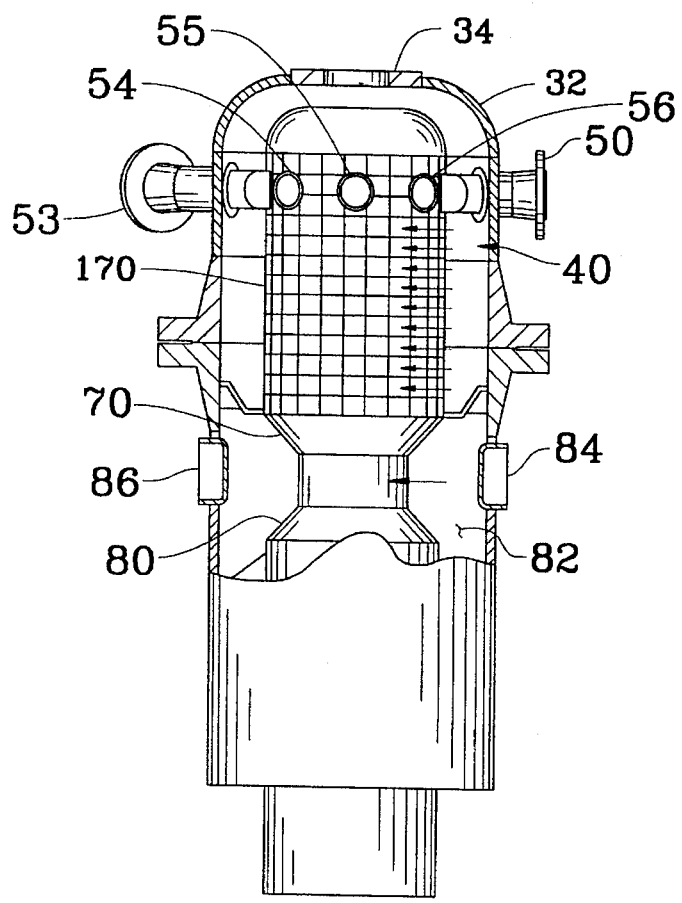
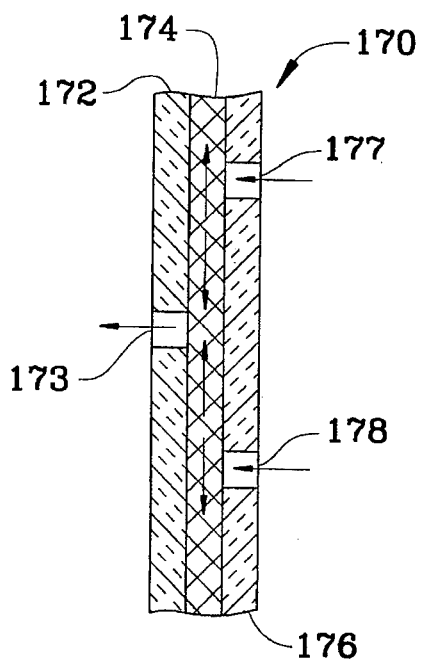

BIOMASS FUEL TURBINE COMBUSTER

This application is a continuation of application No. 08/264,010, filed Jun. 22, 1994, now abandoned.

BACKGROUND ART

1. Field of the Invention

The present invention relates to turbine combustors, and more particularly to a biomass fueled turbine combustor utilized in conjunction with a biomass fueled pressurized gasifier.

2. Description of the Related Art

Efficient use of waste products is a mandate from our waste conscious society. Agricultural waste products and other cellulosic waste material such as wood waste, also known as biomass, are reusable natural resources which can be utilized as a source of energy production. Biomass is converted to a low British Thermal Unit (BTU) gas which can be converted into a useful fuel for a gas turbine engine. However, standard turbine combustors are not suitable for combustion of low BTU gas because of among other factors, flame stability problems. The increased use of biomass as a fuel source has been limited by the inability to fully utilize biomass as a fuel in conjunction with power generators.

The nitrogen content of biomass fuel creates additional difficulties that are less of a problem with the combustion of natural gas. The nitrogen content may result in high nitrogen oxide (NOx) emissions in the exhaust gases which are pollutants deleterious to human health and agricultural production. Nitrogen dioxide ($NO_2$) and nitrogen oxide (NO) pose the greatest potential harm to human health and agricultural production, and their formation in the combustion of biomass fuel must be limited in order to more fully utilize biomass fuel as an energy source. Nitrogen oxide formation in fuel is a consequence of organically bound nitrogen converted to ammonia radicals ($*NH_3$) and subsequently converted to nitrogen oxide (NO) through reaction with oxygen ($O_2$). The inventive minds of the biomass energy industry have set forth the principals of how to achieve combustion of low BTU gas with limited formation of nitrogen oxides (NO). The principals include staged combustion, in which the oxygen supply is limited in the rich (greater than stoichiometric) burn zone, and the remaining required oxygen is supplied in the lean (less than stoichiometric) burn zone. Another principal to limit nitrogen oxide formation is aerodynamic recirculation of heat and re-radiation from refractory surfaces during combustion of the low BTU gas in order to achieve flame stabilization.

Another problem associated with burning low BTU gas derived from biomass is tar buildup. Tar buildup occurs when produced gas is cooled before entering the combustion chamber, resulting in tar buildup around valves and other places. This occurs even with tar cleanup devices added to the system and results in heavy maintenance to keep the units operating. If the fuel gas could be injected into the combustion chamber hot, which would also retain its sensible heat content, then tar buildup would be reduced and thermal efficiency improved for a biomass fueled integrated gasifier/gas turbine power plant.

The inventive minds of the gas turbine combustor industry have brought forth several inventions to limit nitrogen oxide formation in combustors. However, these combustors have not been directed to burning low BTU gas derived from biomass.

DeCorso, U.S. Pat. No. 4,787,208, discloses a combustor for inhibiting NOx formation through limiting oxygen in a rich burn zone, and providing a low combustion temperature in the lean burn zone. In this manner, nitrogen molecules cannot compete with carbon and hydrogen for limited amount of oxygen molecules.

Joshi et al, U.S. Pat. No. 4,912,931, discloses a staged low NOx gas turbine combustor having a lining for the interior wall of the primary combustion chamber composed of a porous fibrous refractory thermally insulative material with a layer composed of compliant fibrous refractory thermally insulative material between the lining and the shell of the primary combustion chamber, the invention directed towards providing a combustor which burns heavy crude oil while maintaining low NOx emissions.

Joshi et al, U.S. Pat. No. 4,928,481, discloses a staged low NOx gas premix gas turbine combustor having first and second stage regions in which a lean premixture of fuel and compressed air are introduced into the first stage producing a first stream of combustion, and a second premixture of fuel and compressed air are introduced into the second stage producing a second stream of combustion which collides with the first stream producing a divergent intensely turbulent flow.

SUMMARY OF THE INVENTION

The present invention is a turbine combustor apparatus for utilization in conjunction with a biomass fueled pressurized gasifier for generating electrical power. The present invention is constructed to burn hot low BTU gas derived from biomass, in a manner which limits harmful NOx emissions and prevents tar buildups. The gas for fueling the combustion is derived from biomass which can be a wide variety of agricultural waste such as wood milling residues, wood chips, sawdust, nutshells, cattle manure, bagasse, rice hulls, cotton gin trash, and the like. In the preferred embodiment of the present invention, the fuel gas is derived from cotton gin trash which is a by-product of processing cotton through a cotton gin. The gasification of the biomass into a useable fuel has several beneficial aspects such as providing an alternative fuel source to fossil fuels and reducing trash for disposal in a land fill.

The present invention consist of a housing for enclosing the other components of the combustor. At the top of the housing is a flange mount for inserting an ignition means and an alternative fuel supply for the combustor. Inside the housing is a primary combustion chamber and a secondary combustion chamber. The primary combustion chamber receives fuel and air from a plurality of injection nozzles. The ratio of fuel to air in the primary combustion chamber allows for a rich burn of the fuel which limits the combustion temperature and thus inhibits NOx production. A novel aspect of the present invention is the independent (external from the combustor) control of the rate of air injected into the primary combustion chamber. Previously to the present invention, the flow of air was usually controlled through the size of the holes in a combustion chamber. Through independent control of the air flow rate and fuel flow rate, the present invention can maintain a stable and rich combustion of fuel gas regardless of its BTU content.

The primary air and fuel are delivered to the plurality of injection nozzles through a plurality of primary air delivery tubes, and a plurality of fuel delivery tubes respectively, which are in flow communication with the plurality of injection nozzles through a plurality of primary air inlet ports and a plurality of fuel inlet ports, respectively. A primary air transport duct in flow communication with the plurality of primary air delivery tubes, distributes primary air to the plurality of primary air delivery tubes. A fuel transport duct in flow communication with the plurality of fuel delivery tubes, distributes fuel to the plurality of fuel delivery tubes. The rate of flow of the primary air and fuel are controlled through valves which are themselves controlled by a central microprocessor.

The primary combustion chamber has a multiple layer wall which functions to reradiate heat in order to maintain a stable flame and constant temperature in the chamber. In the preferred embodiment of the present invention, the exposed layer of the multiple layer wall is composed of a monolithic ceramic material which may be coated to increase the emissivity and protect the exposed layer from the high temperatures of combustion. The second layer in the preferred embodiment is composed of a dense fibrous material and the third layer is also composed of a dense fibrous material. An exterior layer is composed of an alloy material having a low coefficient of thermal expansion.

Downstream of the primary combustion chamber, and in flow communication with the primary combustion chamber, is a combustion chamber nozzle. The combustion chamber nozzle has a multiple layer wall which enables it to withstand the high combustion temperatures without cooling air penetrating the nozzle's wall. In the preferred embodiment of the invention, the wall is comprised of an exposed layer composed of a ceramic material, a middle layer composed of a fiber metal which allows for air flow, and an exterior layer composed of a metal alloy material.

Directly downstream of combustion chamber nozzle, and in flow communication with the combustion chamber nozzle, is the secondary combustion chamber. Secondary air is introduced directly downstream of the combustion chamber nozzle to create a lean burn of the fuel. The secondary air is first injected into a secondary air chamber, which surrounds the upper portion of the secondary air chamber and the combustion chamber nozzle. The mass flow rate of secondary air injection is independently controlled through valves which are themselves controlled by the aforementioned central microprocessor. The mass flow rate of the secondary air is such that a lean burn zone is maintained as compared to the rich burn zone in the primary combustion chamber. The secondary combustion chamber has a wall composed of a metal alloy material with stacked ring and effusion cooling.

A tertiary air chamber surrounds the lower portion of the secondary air chamber. The tertiary air chamber provides tertiary air at a mass flow rate which is the balance of the air being supplied to all of the chambers by the turbine's compressor. The flow rate of the tertiary air is independently controlled by valves which are themselves controlled by the central microprocessor. The combustion product from this dilution zone is expelled toward a power turbine blades for rotating a shaft.

In this novel manner, the present invention is able to burn tar laden low BTU biomass gas with low NOx emissions and reduced tar buildup to create a combustion product to rotate a shaft.

It is an object of the present invention to provide a combustor for burning biomass fuel.

It is a further object of the present invention to provide a combustor which is utilized in conjunction with a biomass fueled pressurized gasifier.

It is a further object of the present invention to provide a combustor which reliably burns low BTU gas derived from biomass.

It is a further object of the present invention to provide a combustor which minimizes NOx emissions.

It is a further object of the present invention to provide a combustor which effectively burns tar.

It is a further object of the present invention to provide a combustor apparatus which independently controls the rate of air and fuel injected into the various combustion chambers.

BRIEF DESCRIPTION OF THE DRAWINGS

The present invention is further described in connection with the accompanying drawings, in which:

FIG. 4 is a drawing illustrating a side perspective a injection nozzle of the present invention.

FIG. 7 is a drawing illustrating a longitudinal sectional view of one embodiment of the primary combustion chamber of the present invention.

FIG. 8 is a drawing illustrating a cross sectional view of one embodiment of the wall of the primary combustion chamber of the present invention.

DETAILED DESCRIPTION OF THE INVENTION

Figure 1:
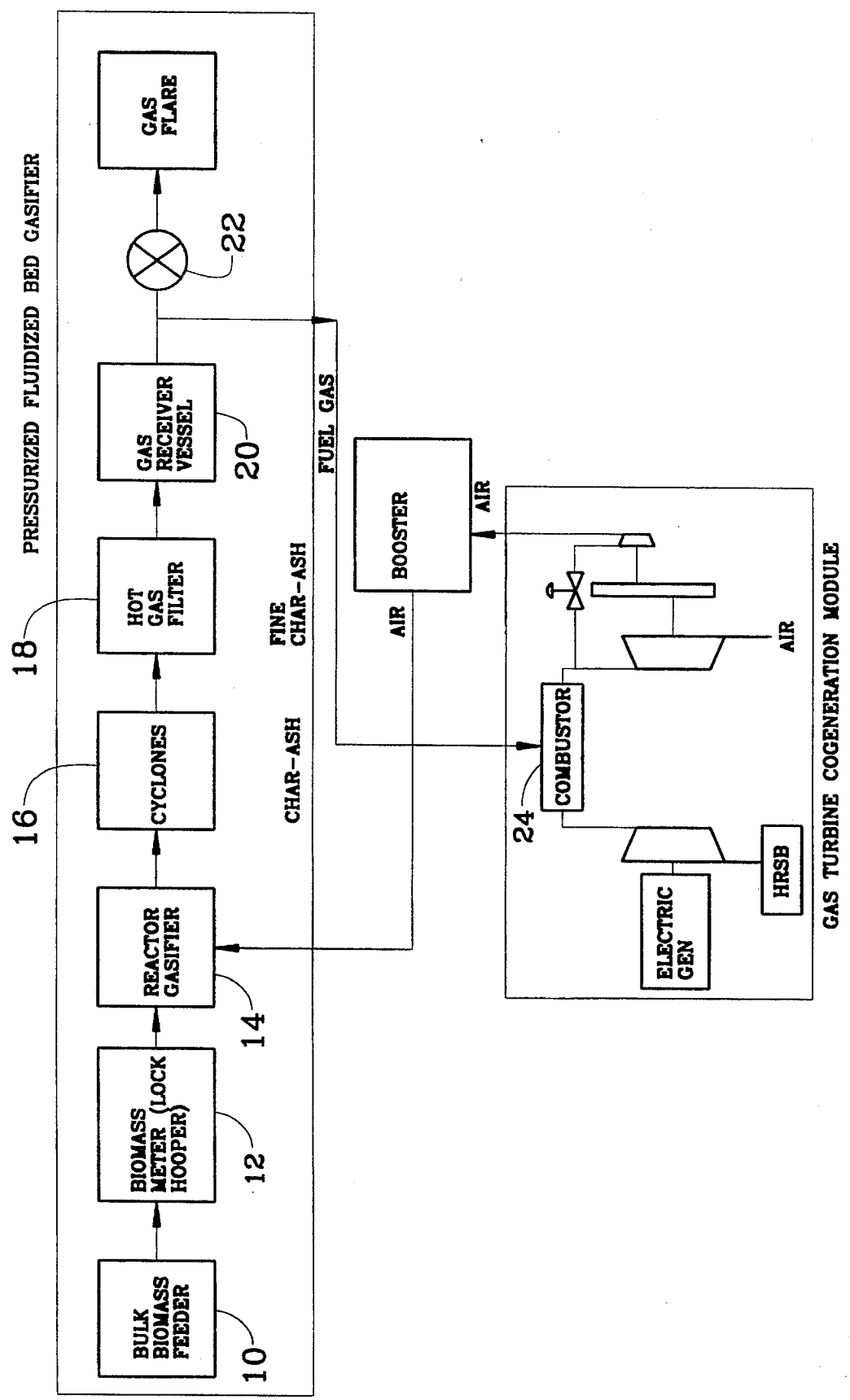
FIG. 1 is a drawing illustrating a block diagram of the biomass fueled, gasifier/gas turbine power plant.

There is illustrated in FIG. 1 a block diagram of the biomass fueled gasifier/gas turbine power plant. Referring to FIG. 1, at step 10 biomass, in the preferred embodiment cotton gin trash, is loaded into a bulk biomass feeder. At step 12 the biomass lock hopper and meter pressurizes the biomass which is then metered to a reactor vessel at step 14. At step 14 air from the gas turbine booster compressor is fed into the reactor vessel which forms a biomass fuel gas laden with ash. At step 16 most of the ash is separated from the biomass fuel gas by a cyclone, and the biomass fuel gas is then further filtered at step 18. The filtered biomass fuel gas is placed in a receiver tank at step 20. The biomass fuel gas exits the tank via a gas pressure regulator valve at step 22 and flows to the combustor at step 24. The biomass fuel gas is mixed with compressed air in the combustion chambers of the present invention to produce a combustion product which drives a gas turbine in order to create electrical power. A small portion of the compressed air from the turbine compressor section is the air fed into the reactor vessel at step 14 which produces the biomass fuel gas supplied to the turbine combustor at step 24, and in this manner the system is integrated.

Figure 2:
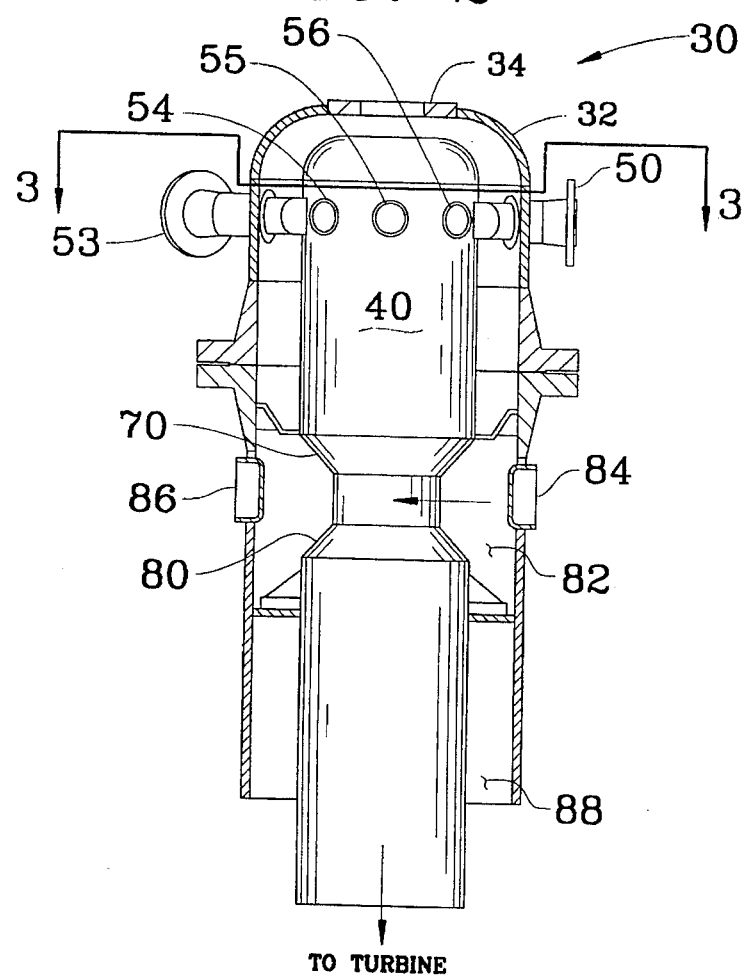
FIG. 2 is a drawing illustrating a longitudinal sectional view of the present invention.

There is illustrated in FIG. 2 a drawing illustrating a longitudinal sectional view of the present invention. Referring to FIG. 2, combustor apparatus 30 is defined by housing 32 which encloses most of the other components of combustor apparatus 30. At the top of the housing 32 is a flange mount 34 where an ignition means 36, not shown, for beginning the combustion is placed, and a fuel nozzle 38, not shown, for supplying a start fuel and an alternative fuel source for combustion is introduced into the combustor apparatus 30. Housing 32 is a pressurized vessel defined by a wall composed of steel. The primary combustion chamber 40 is cylindrical in shape, and fuel gas and primary air are mixed therein for initial combustion. In primary combustion chamber 40, a rich burn is maintained through limiting the rate of air injected into the primary combustion chamber 40. The primary air and fuel gas are injected into primary combustion chamber 40 through a plurality of injection nozzles 50-57 located around the upper portion of the primary combustion chamber 40. The fuel gas is injected into primary combustion chamber 40 through the plurality of injection nozzles 50-57 at an appropriate mass flow rate. In the preferred embodiment, the flow rate of the fuel gas is fifty-two point six kilograms per minute. The fuel is injected into primary combustion chamber 40 at a high velocity, in the range of two thousand two hundred eighty-five meters per minute. The primary air is injected into primary combustion chamber 40 through the plurality of injection nozzles 50-57 at an appropriate mass flow rate. In the preferred embodiment, the flow rate of the primary air is thirty-six kilograms per minute.

Downstream of the primary combustion chamber 40, and in flow communication, is chamber combustion nozzle 70. The chamber combustion nozzle 70 is in flow communication with the secondary combustion chamber 80 which is directly downstream of the chamber combustion nozzle 70. Surrounding the chamber combustion nozzle and the upper portion of the secondary combustion chamber 80 is the secondary air chamber 82 which is enclosed within housing 32 which forms the outside boundary of the secondary air chamber 82. Secondary air is injected into the secondary air chamber 82 through a plurality of secondary air injectors 84 and 86. Secondary air is injected into secondary air chamber 82 at a mass flow rate greater than the injection of primary air into primary combustion chamber 40. In the preferred embodiment, secondary air is injected into secondary air chamber 82 at a flow rate of forty-six point five kilograms per minute. Surrounding the lower portion of the secondary combustion chamber 80 is a tertiary air chamber 88 which is enclosed by housing 32 which forms the outside boundary of the tertiary air chamber 88. Tertiary air chamber 88 is supplied with air to provide dilution of the combustion product in order to lower the temperature of the final product to a level which is tolerable by the turbine blades. Tertiary air is injected into the tertiary air chamber at a mass flow rate greater than the injection of secondary air. In the preferred embodiment, the flow rate of tertiary air is two hundred seventy-for point three kilograms per minute. The flow rate of the combustion product expelled to the land based stationary turbine, not shown, is the sum of the flows entering the combustor apparatus 30. In the preferred embodiment, the flow rate of the combustion product expelled is four hundred nine point four kilograms per minute.

Figure 3:
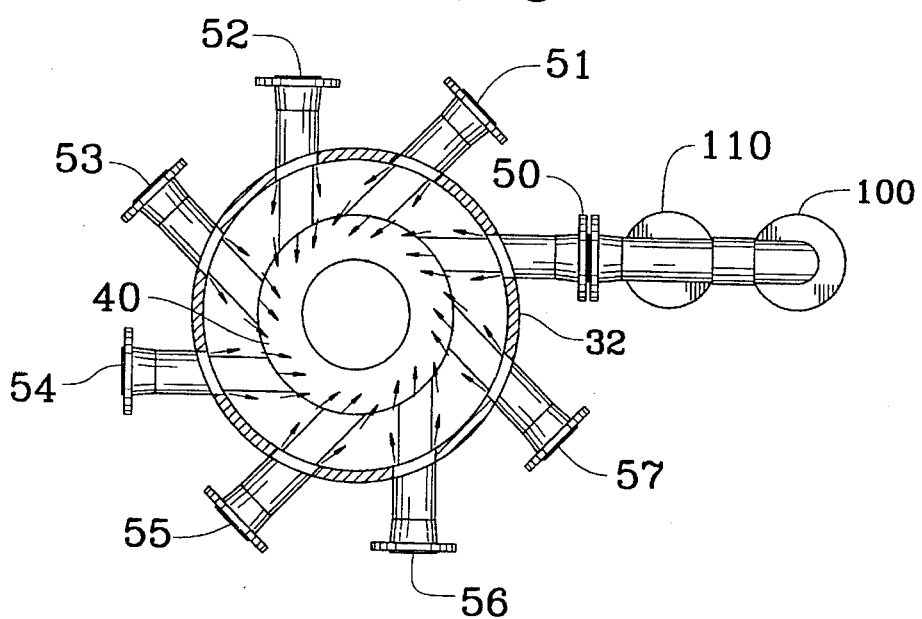
FIG. 3 is a drawing illustrating a top perspective of the interior of the present invention.

FIG. 3 is a drawing illustrating a top perspective of the interior of the present invention. FIG. 4 is a drawing illustrating a side perspective a injection nozzle of the present invention. Referring to FIG. 3 and FIG. 4, the plurality of injection nozzles 50-57 are equally spaced around the primary combustion chamber 40. The plurality of injection nozzles 50-57 are positioned at a slight angle to radial, in a ring around the upper end of primary combustion chamber 40. In the preferred embodiment, the angle is five degrees to radial. The exterior portion of each of the plurality of injection nozzles 50-57 are outside of housing 32. The exterior portion of each of the plurality of injection nozzles 50-57 are mated with a plurality of fuel inlet ports 100-107 and a plurality of primary air inlet ports 110-117. The primary air and fuel gas flow through separate passage ways in each of the plurality of injection nozzles 50-57, initially mixing at the interior tip of each of the plurality of injection nozzles 50-57 inside primary combustion chamber 40. The fuel gas enters each of the plurality of fuel inlet ports 100-107 at a maximum temperature of eight hundred fifty degrees Celsius, and a minimum temperature of four hundred fifty degrees Celsius. The plurality of injection nozzles 50-57 are positioned to inject the fuel gas and primary air into the cylindrically shaped primary combustion chamber 40 so as to promote a consistent and very turbulent flow in the primary combustion chamber 40. The combustion in primary combustion chamber 40 and secondary combustion chamber 80 has a maximum temperature limit of fifteen hundred degrees Celsius.

Figure 5:
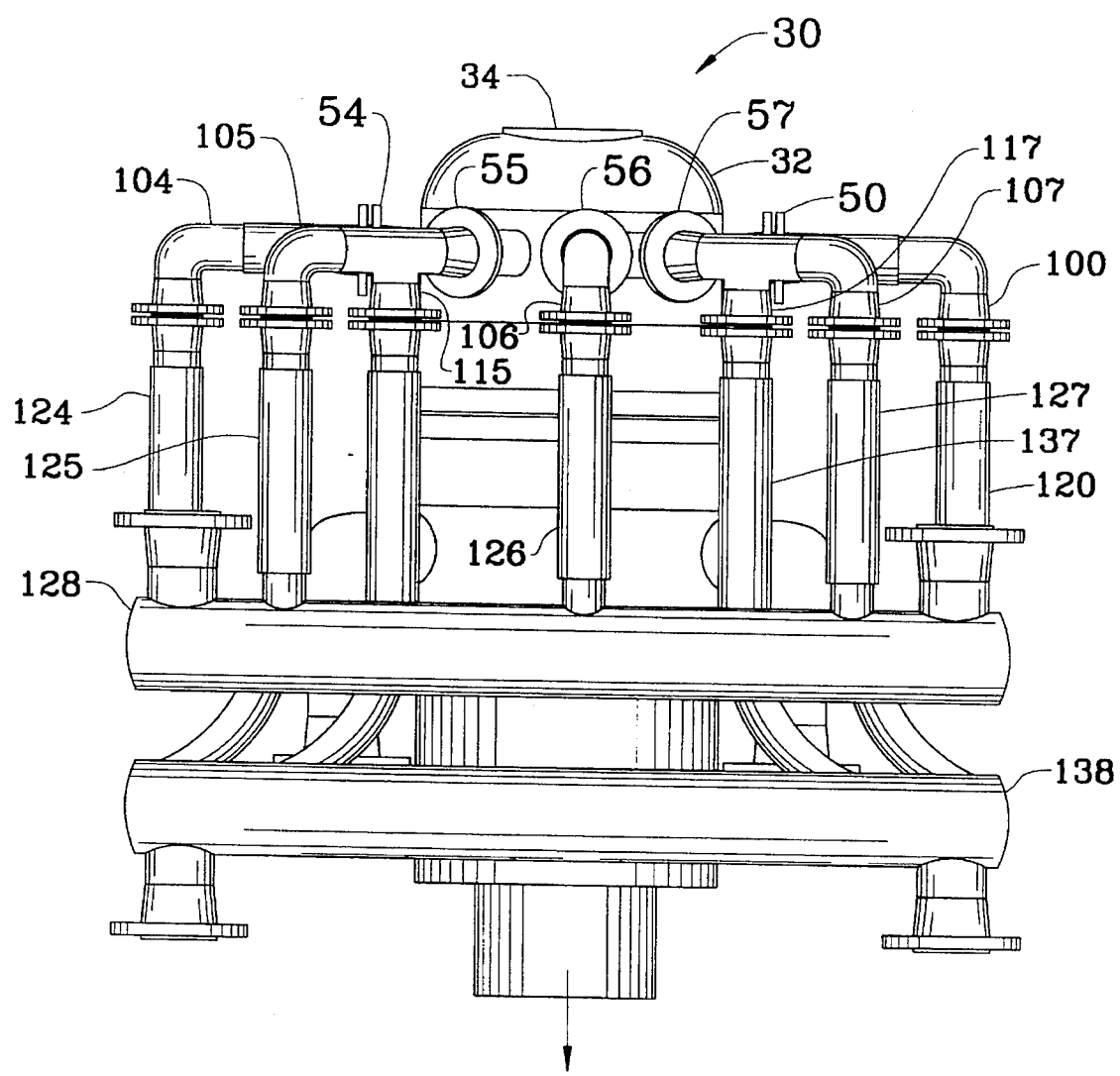
FIG. 5 is a drawing illustrating a longitudinal view of the present invention.

FIG. 5 is a drawing illustrating a longitudinal view of the present invention. Referring to FIG. 5, combustor apparatus 30 is defined by housing 32 which encloses other components of combustor apparatus 30. The plurality of injection nozzles 50-57 protrude through housing 32 and are mated to the plurality of fuel inlet ports 100-107 and the plurality of primary air inlet ports 110-117. The plurality of fuel inlet ports 100-107 are mated to a plurality of fuel delivery tubes 120-127 which themselves are mated to a fuel transport duct 128. Fuel flows through the fuel transport duct 128, to the plurality of fuel delivery tubes 120-127, to the plurality of fuel inlet ports 100-107, through the plurality of injection nozzles 50-57 and into primary combustion chamber 40. The flow rate of the fuel gas is independently controlled by a valve 140, not shown, which is itself controlled by a central microprocessor 150, not shown. The plurality of primary air inlet ports 110-117 are mated to a plurality of primary air delivery tubes 130-137 which themselves are mated to a primary air transport duct 138. Primary air flows through the primary air transport duct 138, to the plurality of primary air delivery tubes 130-137, to the plurality of primary air inlet ports 110-117, through the plurality of injection nozzles 50-57 and into primary combustion chamber 40. The flow rate of the primary air is independently controlled by an air inlet valve 142, not shown, which is itself controlled by the central microprocessor 150, not shown.

Figure 6:
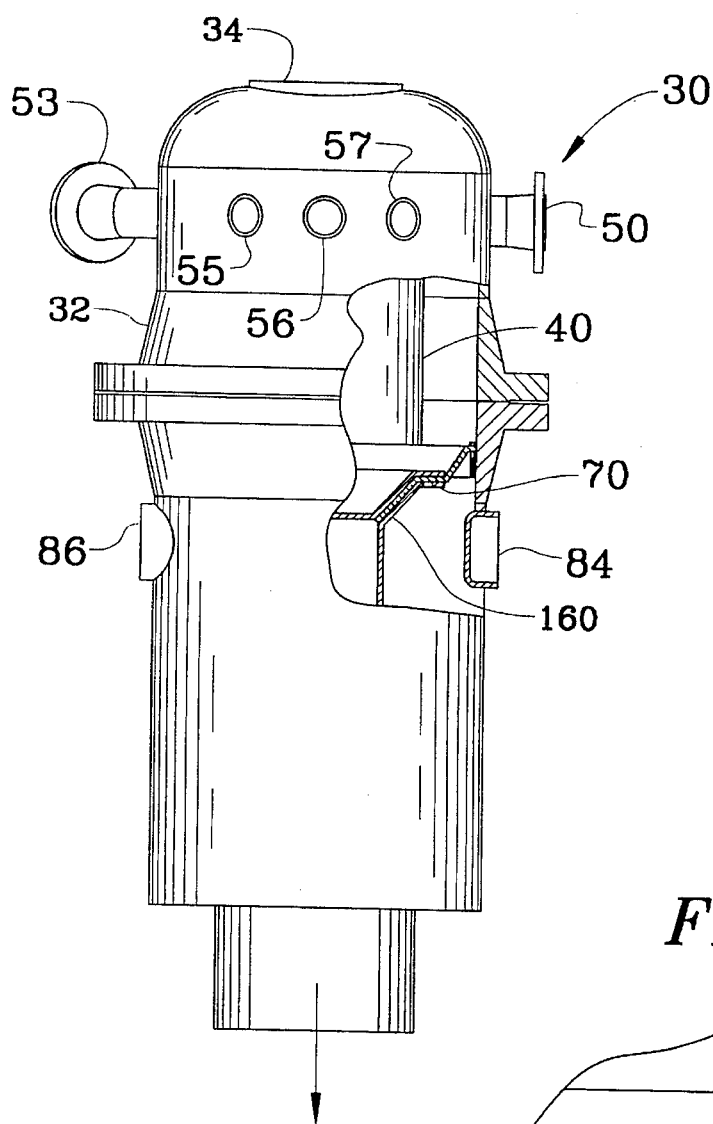
FIGS. 6 and 6A are drawings illustrating a sectional view of the combustion chamber nozzle of the present invention.
Figure 6A:
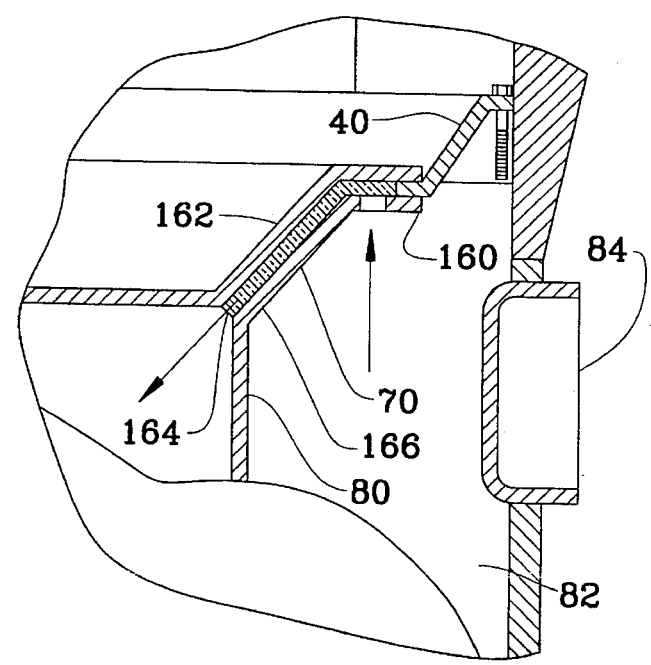

FIGS. 6 and 6A are drawings illustrating a sectional view of the combustion chamber nozzle of the present invention. Referring to FIGS. 6 and 6A, chamber combustion nozzle 70 is downstream of primary combustion chamber 40 and upstream of secondary combustion chamber 80 which are all enclosed within housing 32. Surrounding chamber combustion nozzle 70 and the upper portion of secondary combustion chamber 80 is secondary air chamber 82. The wall 160 of chamber combustion nozzle 70 is composed of multiple layers. In the preferred embodiment, exposed layer 162 is composed of a ceramic material such as plasma sprayed zirconium oxide to ensure that the chamber combustion nozzle 70 can withstand the high temperatures of combustion. The exposed layer 162 also prevents the penetration of air into chamber combustion nozzle 70 to ensure that lean burning of the combustion product of primary combustion chamber 40 does not occur until the combustion product enters secondary combustion chamber 80. The middle layer 164 is a compliant layer composed of a fibrous metal such as Hoskins 875. The exterior layer 166 is composed of a substrate material such as Hastelloy-X, and also acts as a boundary for secondary air chamber 82. The chamber combustion nozzle 70 is conical in shape with a decreasing diameter, beginning at the end of primary combustion chamber 40 and thereafter decreasing as chamber combustion nozzle 70 approaches the upper portion secondary combustion chamber 80, the smallest diameter of chamber combustion nozzle 70 corresponding to the smallest diameter of secondary combustion chamber 80.

FIG. 7 is a drawing illustrating a longitudinal sectional view of one embodiment of the primary combustion chamber of the present invention. FIG. 8 is a drawing illustrating a cross sectional view of one embodiment of the wall of the primary combustion chamber of the present invention. Referring to FIG. 7 and FIG. 8, primary combustion chamber 40 is enclosed by a multiple layer hot wall combustion liner 170. The liner 170 defines the cylindrically shaped primary combustion chamber 40, forming its outer boundary. The exposed layer 172 of liner 170 is composed of a plurality of ceramic tiles having a plurality of interdispersed slots 173 for allowing primary air to flow into primary combustion chamber 40. The plurality of ceramic tiles are plasma sprayed zirconium dioxide ceramic. The exposed layer 172 re-radiates heat to the fuel gas to maintain a stable combustion. The middle layer 174 of liner 170 is composed of a compliant fiber metal such as Hoskins 875. Primary air flows through the middle layer 172, through the plurality of interdispersed slots 173, and into primary combustion chamber 40. The third layer 176 of liner 170 is composed of a substrate material such as Hastelloy X. The third layer 176 has a plurality of interdispersed air inlet slots 177 and 178 for permitting the inflow of primary air into middle layer 174. In this embodiment, a primary air chamber 180 is created between liner 170 and the wall of housing 32. In this design, there is eighty percent less air flowing through the liner than is normal in standard gas turbine combustors of this size.

Figure 9:
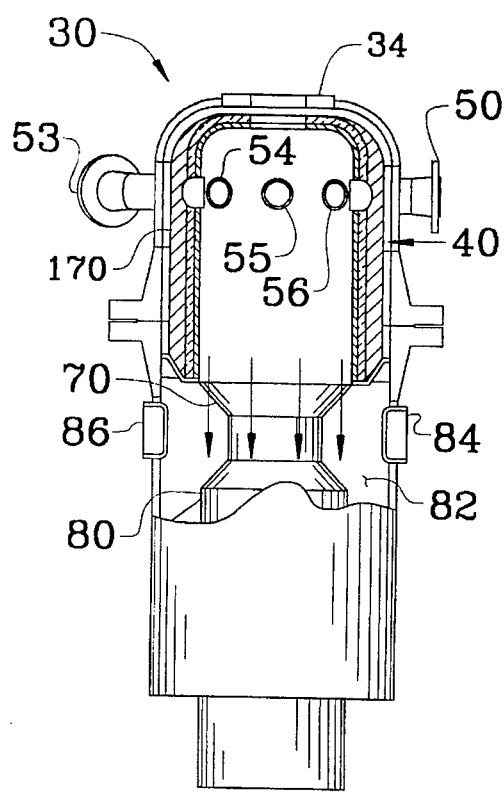
FIGS. 9 and 9A are drawings illustrating a longitudinal sectional view of the primary combustion chamber of the present invention.
Figure 10:
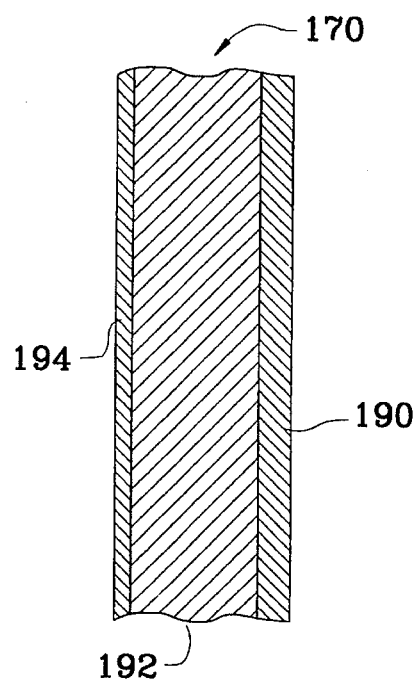
FIG. 10 is a drawing illustrating a cross sectional view of one embodiment of the wall of the primary combustion chamber of the present invention.

FIG. 9 is a drawing illustrating a longitudinal sectional view of the primary combustion chamber of the present invention. FIG. 10 is a drawing illustrating a cross sectional view of one embodiment of the wall of the primary combustion chamber of the present invention. Referring to FIG. 9 and FIG. 10, primary combustion chamber 40 is enclosed by a multiple layer hot wall combustion liner 170. The liner 170 defines the cylindrically shaped primary combustion chamber 40, forming its outer boundary. The exposed layer 190 of liner 170 is composed of a dense aluminia fiber such as Zircar SALI. Exposed layer 190 is coated with an erosion resistant, thermal resistant and high emissivity coating such as H & S FR-2900BL or a plasma sprayed ceramic coating. The exposed layer 190 re-radiates heat to the fuel gas to maintain a stable combustion. A second layer 192 of liner 170 is composed of a dense aluminia fiber such as Zircar ALC. A exterior layer 194 is composed of a metal alloy material with a low coefficient of thermal expansion such as Incoloy 909.

Figure 9A:
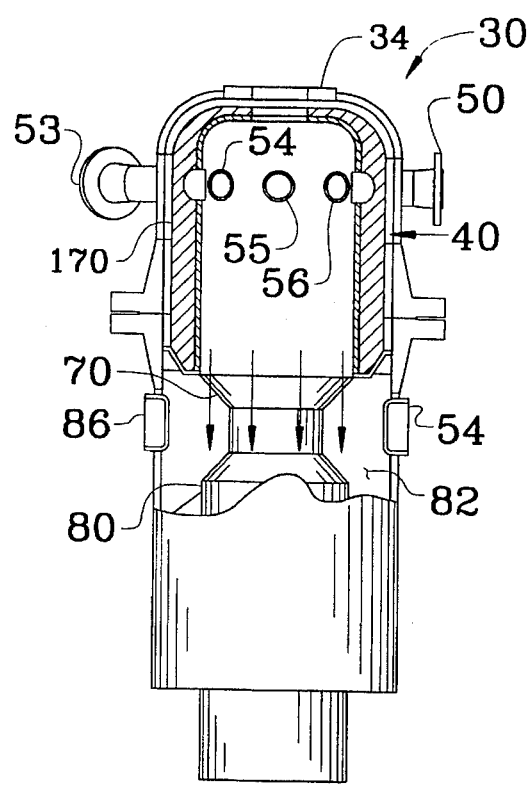
Figure 11:
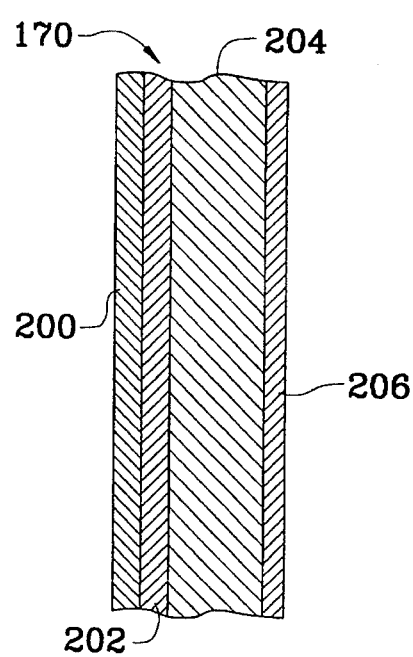
FIG. 11 is a drawing illustrating a cross sectional view of the preferred embodiment of the wall of the primary combustion chamber of the present invention.

FIG. 9A is a drawing illustrating a longitudinal sectional view of the primary combustion chamber of the present invention. FIG. 11 is a drawing illustrating a cross sectional view of the preferred embodiment of the wall of the primary combustion chamber of the present invention. Referring to FIG. 9A and FIG. 11, primary combustion chamber 40 is enclosed by a multiple layer hot wall combustion liner 170. The liner 170 defines the cylindrically shaped primary combustion chamber 40, forming its outer boundary. The exposed layer 200 of liner 170 is composed of a monolithic ceramic such as nitride bounded silicon carbide, or Syalon-BN manufactured by Vesuvius McDanel. Exposed layer 200 can be plasma sprayed coated with Zirconia to further protect it from oxidation. A second layer 202 of liner 170 is composed of a dense aluminia fiber such as Zircar SALI. A third layer 204 of liner 170 is composed of dense aluminia fiber such as Zircar ALC. An exterior layer 206 is composed of a metal alloy material with a low coefficient of thermal expansion such as Incoloy 909.

The combustor apparatus 30 of the present invention begins is a major component of a more or less standard gas turbine engine. In operation, the combustor apparatus 30 is intended to burn hot low BTU gas supplied from a biomass fueled pressurized air blown gasifier, not shown. The operation begins with a fuel, either number two diesel, natural gas or LPG, injected through fuel nozzle 38, not shown, positioned in flange mount 34, into primary combustion chamber 40. Primary air, secondary air and tertiary air are supplied as described above. A spark igniter 36 is used to ignite the fuel/air mixture. The combustor is capable of supplying all of the heat required for full power using the fuels injected through the fuel nozzle 38. The rich, lean and dilution zones of the combustor apparatus 30 are each supplied with primary air, secondary air and tertiary air, the flow rates of the air independently controlled by a microprocessor 150 to minimize nitrogen oxide emissions.

A portion of the turbine's compressor air is further boosted in pressure and used to supply the pressurized gasifier, step 16, with its oxygen. When the biomass fueled pressurized gasifier has reached stable operating conditions, the resulting hot biomass fuel gas is supplied through a high temperature control valve, not shown, to a combustor manifold, not shown, which in turn supplies fuel gas to the fuel transport duct 128. As described above, fuel flows through the fuel transport duct 128, to the plurality of fuel delivery tubes 120-127, to the plurality of fuel inlet ports 100-107, through the plurality of injection nozzles 50-57 and into primary combustion chamber 40. Primary air is concurrently injected through the plurality of injection nozzles 50-57, initially mixing with the fuel at the interior tip of each of the plurality of injection nozzles 50-57 to produce a rich burn of the fuel. As the amount of heat supplied by the biomass fuel gas increases, the amount of heat supplied by the start up fuel injected through the fuel nozzle 38 is reduced proportionately. Once the flow of biomass fuel gas is increased to supply all of the energy required by the turbine, the start up fuel is completely shut off. Primary air, secondary air and tertiary air are supplied from the turbine's compressor. The secondary air produces a lean burn of the combustion product of the primary combustion chamber 40 and the tertiary air dilutes the combustion product. All control signals are received from the microprocessor 150 which has a program that maintains the proper fuel to air ratio in primary combustion chamber 40 and secondary combustion chamber 80 in order to minimize nitrogen oxide emissions.

Shut down of engine is achieved by gradually reducing the amount of fuel and primary air injected into the primary combustion chamber 40. At some point the flame will be extinguished at which time the fuel and primary air will be immediately shut off. Secondary air and tertiary air can still be supplied in secondary combustion chamber 80 until the engine comes to a stop. Air should never be supplied to the primary combustion chamber 40 alone so as to prevent thermal shock of the hot wall combustion liner 170 of primary combustion chamber 40.

While preferred embodiments of the invention have been shown and described, it will be apparent to those skilled in this art that various modifications may be made in the embodiments without departing from the spirit of the present invention. Therefore, the embodiments of the invention in which an exclusive property or privilege is claimed are defined as follows:

I claim:

1. A gas turbine combustor apparatus for utilization in conjunction with a biomass fueled pressurized gasifier, the combustor apparatus comprising:

a housing for enclosing components of the combustor apparatus;

means for igniting fuel and air;

a flange mount for positioning the means for igniting and for an alternative fuel supply for the combustor, the flange mount located at the top of the housing;

a primary combustion chamber for receiving fuel and primary air, the primary combustion chamber having a hot wall combustion liner for reradiating heat;

a plurality of injection nozzles for injecting fuel and primary air into the primary combustion chamber thereby producing a combustion product, the plurality of injection nozzles in flow communication with the primary combustion chamber, the plurality of injection nozzles each having a fuel inlet port outside the housing for receiving fuel, a primary air inlet port outside the housing for receiving primary air, and an interior opening inside the primary combustion chamber, the fuel and primary air initially mixing near the interior opening of each of the plurality of injection nozzles;

a plurality of fuel delivery tubes, each of the plurality of fuel delivery tubes in flow communication with each of the corresponding fuel inlet ports of the plurality of injection nozzles;

a fuel transport duct in flow communication with the plurality of fuel delivery tubes, the fuel transport duct receiving fuel for distribution to the plurality of fuel delivery tubes;

a plurality of primary air delivery tubes, each of the plurality of primary air delivery tubes in flow communication with each of the corresponding primary air inlet ports of the plurality of injection nozzles;

a primary air transport duct in flow communication with the plurality of primary air delivery tubes, the primary air transport duct receiving primary air for distribution to the plurality of primary air delivery tubes;

means for independently controlling the rate of fuel injected into the primary combustion chamber;

means for independently controlling the rate of primary air injected into the primary combustion chamber;

a combustion chamber nozzle in flow communication with the primary combustion chamber, the combustion chamber having a multiple layer wall;

a secondary combustion chamber for lean burning of the combustion product of the primary combustion chamber through introduction of secondary air, the secondary combustion chamber in flow communication with the combustion chamber nozzle, the secondary combustion chamber having an upper portion near the combustion chamber nozzle, and a lower portion having an aperture for expelling the combustion product to a stationary land based turbine, the secondary combustion chamber having a multiple layer wall;

a secondary air chamber, surrounding the combustion chamber nozzle and the upper portion of the secondary combustion chamber, the secondary air chamber providing secondary air to the secondary combustion chamber;

a plurality of secondary air injectors for injecting secondary air into the secondary air chamber, the plurality of secondary air injectors in flow communication with a secondary air source;

means for independently controlling the rate of secondary air injected into the secondary air chamber;

a tertiary air chamber surrounding the lower portion of the secondary combustion chamber, the tertiary air chamber providing tertiary air for dilution of the combustion product in the lower portion of the secondary combustion chamber;

a tertiary air injector for injecting tertiary air into the tertiary air chamber;

means for independently controlling the rate tertiary air injected into the tertiary air chamber;

whereby the flow rates of primary air and fuel injected into the primary combustion chamber are controlled to maintain a rich burn combustion product which flows through the combustion chamber nozzle into the secondary combustion chamber where the flow rate of secondary air injected is controlled to produce a lean burn of the combustion product which then is diluted by a flow of controlled tertiary air before expulsion to the turbine.

2. The turbine combustor apparatus according to claim I wherein the lower liner of the secondary combustion chamber is composed of a metal alloy material with stacked ring and effusion cooling.

3. The turbine combustor apparatus according to claim 1 wherein the multiple layers of the combustion chamber nozzle are an exposed layer composed of a material capable of withstanding the high combustion temperatures, a middle layer composed of a fiber metal for allowing air flow, and an exterior layer composed of substrate material.

4. The turbine combustor apparatus according to claim 1 wherein the hot wall combustion liner of the primary combustion chamber has an exposed layer composed of a monolithic ceramic material with a high emissivity for efficient heat re-radiation, a second layer composed of a dense material, and a third layer composed of a second dense material, and an exterior layer composed of a metal alloy material with a low coefficient of thermal expansion.

5. The turbine combustor apparatus according to claim 1 wherein the hot wall combustion liner of the primary combustion chamber has an exposed layer composed of a dense fiber material with a erosion resistant, high emissivity coating, a second layer composed of a dense fiber material, and an exterior layer composed of a metal alloy material with a low coefficient of thermal expansion.

6. The turbine combustor apparatus according to claim 1 wherein the hot wall combustion liner of the primary combustion chamber has an exposed layer consisting of ceramic tiles having a plurality of interdispersed slots for primary air flow into the primary combustion chamber, a middle layer composed of a compliant fiber metal providing for air flow through the middle layer, and a third layer composed of a substrate material having a plurality of interdispersed slots for an inflow of primary air, a primary air chamber for reception of primary air, located between the third layer and the wall of the housing.

7. The turbine combustor apparatus according to claim 1 wherein the means for independently controlling the rate of fuel injected into the primary combustion chamber is a first valve controlled by a central microprocessor.

8. The turbine combustor apparatus according to claim 1 wherein the means for independently controlling the rate of primary air injected into the primary combustion chamber is a second valve controlled by a central microprocessor.

9. The turbine combustor apparatus according to claim 1 wherein the means for independently controlling the rate of secondary air injected into the secondary air chamber is a third valve controlled by a central microprocessor.

10. The turbine combustor apparatus according to claim 1 wherein the means for independently controlling the rate of tertiary air injected into the tertiary air chamber is a fourth valve controlled by a central microprocessor.

11. The turbine combustor apparatus according to claim 1 wherein the fuel is a hot biomass fuel gas.

12. The turbine combustor apparatus according to claim 11 wherein the hot biomass fuel gas is derived from cotton gin trash.

13. The turbine combustor apparatus according to claim 11 wherein the hot biomass fuel gas is derived from wood waste.

14. The turbine combustor apparatus according to claim 1 wherein the fuel injected into the primary combustion chamber is injected at an appropriate mass flow rate to provide the energy required by the turbine.

15. The turbine combustor apparatus according to claim 1 wherein the primary air injected into the primary combustion chamber is compressed air injected at an appropriate mass flow rate to ensure a rich burn of the fuel.

16. The turbine combustor apparatus according to claim 1 wherein the secondary air injected into the secondary air chamber is compressed air injected at an appropriate mass flow rate to ensure a lean burn of the combustion product.

17. The turbine combustor apparatus according to claim 1 wherein the tertiary air injected into the tertiary air chamber is compressed air injected at an appropriate mass flow rate to dilute the combustion product.

18. The turbine combustor apparatus according to claim I wherein the combustion product expelled to the land based stationary turbine is expelled from the combustor apparatus at a flow rate equalling the flow rates of fuel and air entering the combustor apparatus.

19. The turbine combustor apparatus according to claim 1 wherein the chamber combustion nozzle has a decreasing diameter, beginning at the end of the primary combustion chamber and thereafter decreasing as the chamber combustion nozzle approaches the upper portion secondary combustion chamber, the smallest diameter of the chamber combustion nozzle corresponding to the smallest diameter of the secondary combustion chamber.

20. The turbine combustor apparatus according to claim 1 wherein the combustion temperature in the primary combustion chamber and the secondary combustion chamber has a maximum limit of fifteen hundred degrees celsius.

21. The turbine combustor apparatus according to claim 1 wherein the fuel injected into the primary combustion chamber is injected at a high velocity to ensure a turbulent flow in the primary combustion chamber.

22. The turbine combustor apparatus according to claim 1 wherein the plurality of injection nozzles are positioned at a five degree angle to radial in a ring around the upper end of the primary combustion chamber.

23. The turbine combustor apparatus according to claim 1 wherein the primary combustion chamber has a cylindrical shape, the chamber combustion nozzle has a conical shape, the secondary combustion chamber is comprised of a first cylindrical section attached to the chamber combustion nozzle, a conical second section attached to the first cylindrical section, and a third cylindrical section attached to the second section, larger in diameter than the first cylindrical section and open at the end, the physical design of the primary combustion chamber, chamber combustion nozzle, secondary combustion chamber and the angle of the plurality of injection nozzles, producing therein high turbulence and overlapping flames providing for chemical species mixing required for complete oxidation of the fuel.

* * * * *